Nov. 13, 1934.  V. V. VEENSCHOTEN  1,980,454
TEMPERATURE CONTROLLING MEANS
Filed Jan. 23, 1932  2 Sheets-Sheet 1

INVENTOR
Vincent V. Veenschoten
BY E. J. Andrews
ATTORNEY

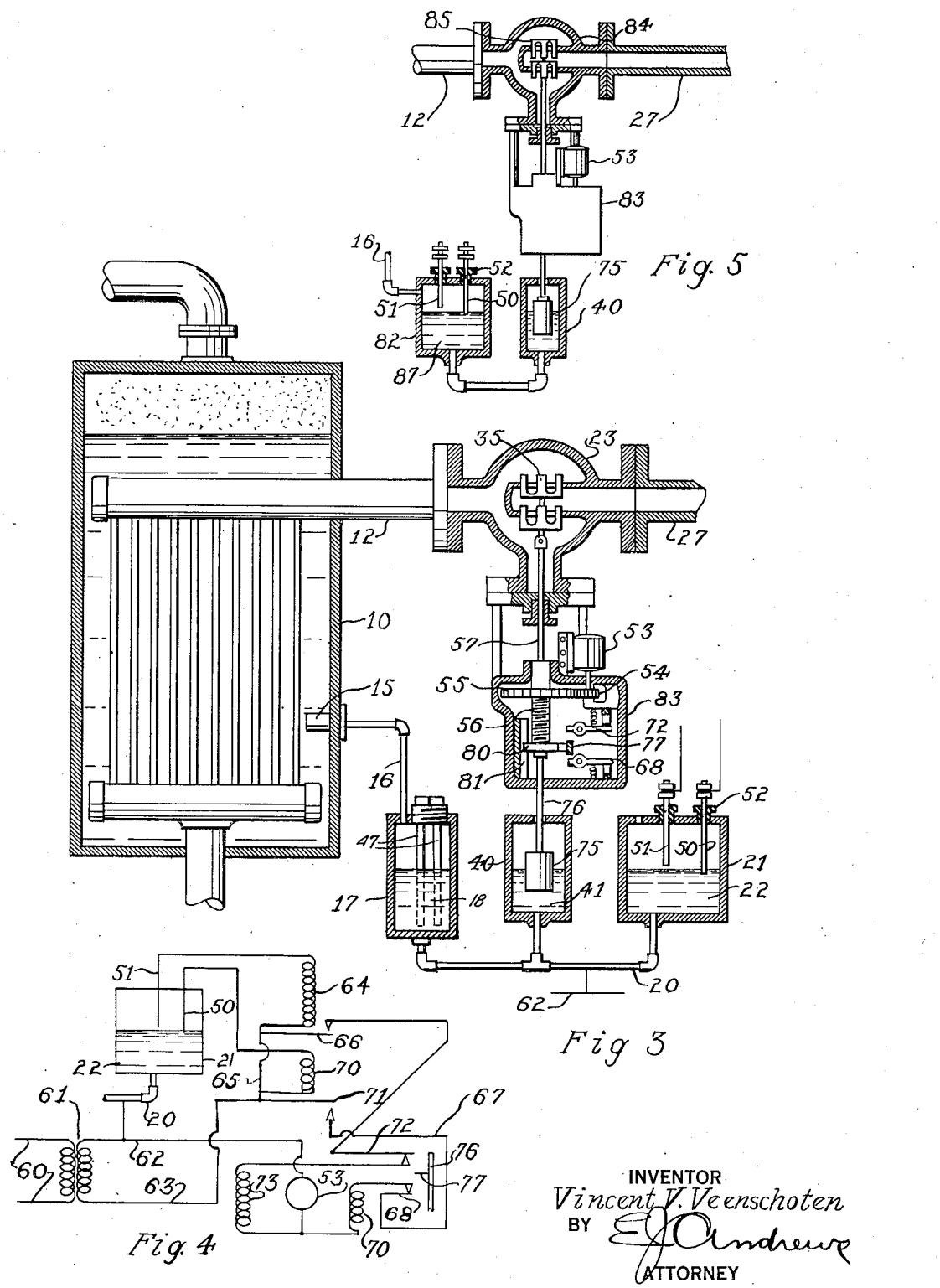

Patented Nov. 13, 1934

1,980,454

UNITED STATES PATENT OFFICE 1,980,454

TEMPERATURE CONTROLLING MEANS

Vincent V. Veenschoten, Erie, Pa., assignor to Northern Equipment Company, Erie, Pa., a corporation of Pennsylvania Application January 23, 1932, Serial No. 588,312

7 Claims. (Cl. 236—18)

This invention relates to temperature controlling means, the particular object of the invention being to maintain substantially uniform the temperature of a fluid by controlling the passage of another fluid to the temperature controlling means. Although the invention is applicable to various other uses, as illustrating my invention I have shown it as applied to an evaporating system, in which a liquid being evaporated is heated by steam passed into a container containing the liquid, and preferably into a system of tubes mounted in the container and into or through which the steam passes. The general method involved in the invention is the introduction into the liquid to be evaporated of a thermostat which contains a fluid, preferably a volatile liquid, and using the expansive forces of the liquid for controlling the amount of steam that is to flow to the system, so as to maintain uniform the liquid being evaporated.

The control of the amount of steam by this thermostat is brought about by the use of a mercury container in which the expansive force of the fluid in the thermostat acts on the surface of the mercury, and this action, by means of intermediate mechanism, controls the passage of the steam to the system so as to maintain substantially uniform the temperature of the liquid which is being evaporated.

Figure 2:
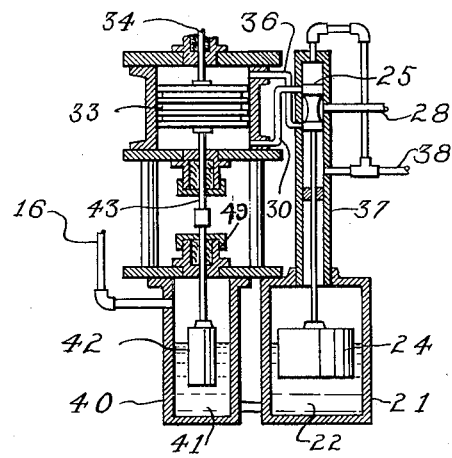
Figure 1:
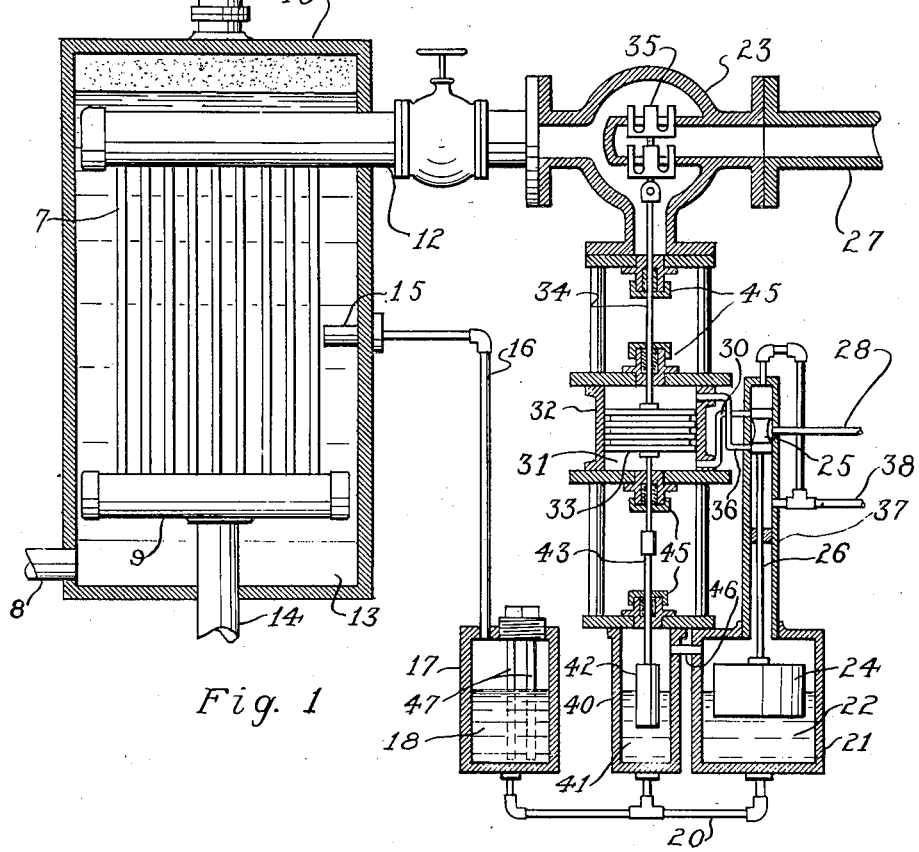

Of the drawings, Fig. 1 is a sectional elevation of a system, more or less diagrammatical, which embodies features of my invention; Figs. 2, 3 and 5 are views of similar systems showing modifications thereof; and Fig. 4 is a diagrammatic view of the electric circuits of the systems of Figs. 3 and 5.

Referring to Fig. 1, the liquid 13 to be evaporated is contained in the tank 10, and the gas evaporated and driven off from the liquid is transmitted wherever desired through a pipe 11. Steam for heating the liquid is transmitted to the tank through a pipe 12 and into the tube system 17 and, thus, into the lower pipe 9 and out of the tank through a pipe 14. Liquid may be supplied to the tank 10 through a pipe 8. It is to be understood, however, that the details of these arrangements may be varied to suit conditions. In fact, the steam might be passed directly into the liquid to be evaporated and various other changes within the scope of the invention could be made.

Suitably positioned in the tank is a thermostatic vessel 15 containing in operation a suitable liquid, preferably a liquid which has a boiling point slightly higher than the normal boiling point of the liquid to be evaporated. This vessel is connected, by means of a pipe 16, to a container 17. In the lower portion of this container is a mass of mercury 18, and the lower portion of the container is connected, by a pipe 20, with another container 21. The pipe 16 and the chamber of the container 17 above the mercury is filled with a liquid, by means of which the variations in pressure in the vessel 15 are transmitted to the container 17. As the vessel 15 increases in temperature, the expansion of the liquid therein will increase the pressure on the mercury 18 and force some mercury through the pipe 20 in the container 21. The increase in elevation of the mercury 22 in the container 21, by suitable means, will decrease somewhat the opening of the valve 23 which controls the flow of steam through the pipe 12 to the tank.

In this case, I prefer to transmit the movement of the mercury 22 to the valve 23 by means of a float 24 floating on the mercury. As the float rises, a pilot valve 25, by means of a valve stem 26, is elevated and pressure fluid from a suitable supply will act, through the connecting pipe 28 and the pipe 30, and will thus increase the pressure in the lower end of the chamber 31 of the cylinder 32. Mounted in this chamber is a piston 33 which, as the pressure increases, will be forced upwardly and this, by means of a stem 34, will force upwardly somewhat the plunger 35, thus closing more the valve 23.

It will be obvious that, in case of a decrease in temperature of the liquid 13 and of the vessel 15, the pressure in the container 17 will decrease and, thus, allow some of the mercury to flow from the container 21 back to the container 17. This will allow the float 24 to sink, and will lower the pilot valve so as to pass pressure fluid through the pipe 36 into the upper end of the chamber 31. This will force downwardly the piston 33 and open more the valve 23, thus allowing more steam to flow to the tank 10, increasing the temperature of the liquid therein.

It will be understood that, when the pilot valve 25 is elevated, allowing pressure fluid to flow through the pipe 30 to the chamber 31, the pilot valve will open the outlet to the pipe 36 and, thus, allow the fluid in the chamber 31 above the piston to flow out of the pipe 36. This liquid will then flow into the pipe 37 and out of the pipe 38 to any suitable trap or other means for disposing of the exhaust liquid. Similarly when the pilot valve sinks, the exhaust liquid will flow out from the lower end of the chamber 31 through the pipe 30.

When the pilot valve 25 is operated, allowing pressure fluid to flow into one end of the chamber 31, the valve 23 will be completely opened or closed, as the case may be, unless means are provided for preventing this. The change in temperature of the liquid 13 by the variations of the opening of the valve 23 will vary the temperature of the liquid in the vessel 15, so as to move the pilot valve 25 back to the normal position. But this action is necessarily slow and other means are provided for more quickly operating the pilot valve.

For this purpose I prefer to provide the container 40, having mercury 41 in the lower portion thereof. Also, in this container, partly submerged in the mercury, is a displacement mass 42. This mass is connected, by means of a rod 43, with the piston 33, so that, as the piston 33 is forced upwardly, for instance, by the increase in elevation of the mercury 22, the elevation of the mass 42 will allow mercury to flow from the container 21 to the container 40. This will allow the float 24 to sink and will lower the pilot valve 25 to the normal position, closing the openings to the pipes 30 and 36. If the adjustments are proper, the pilot valve will, in this manner, stop the movement of the piston 33 and of the plunger 35 at the proper time for allowing sufficient variation in steam flow to vary and then maintain the temperature of the liquid 13 at the desired amount.

This adjustment can be brought about by properly proportioning the capacities of the containers 17, 21 and 40, and the size of the float 24 and of the mass 42. It will be understood that, as the mercury level changes in any one of the containers, it will vary more or less in the other two containers, and the relative cross sections of the containers will determine the amount of the level variations which occur. Also, the cross section of the mass 42 will determine the amount of mercury that is affected by the vertical movements of this mass.

In order to avoid the insertion of stuffing boxes, the container 21 is in communication with the pipe 37 and, hence, with the pilot chamber therein. Hence, the liquid pressure in the pipe 37 is at all times effective in the container 21. The stems 34 and 43 are in this case arranged to pass through the stuffing boxes 45, as the fluid pressure acting on the piston 33 may be made sufficient to overcome the friction of the stuffing boxes. The stuffing box 45 of the container 40 may be omitted, or the upper end of the container 40 may be full of liquid and, to allow free movement of the mercury therein, communication may then be made in any suitable manner, such as by means of a pipe 46, with the container 21. This will partly neutralize the effect of any varying pressure in the pipe 37 on the level of the mercury 22.

It is sometimes desirable to vary the relative capacities of the containers temporarily, or at least after the installation has been made, and for this purpose I provide rods 47 which may be inserted in the container 17. By inserting such rods in this container, the cross section thereof may be decreased as much as may be desired and, hence, the amount of mercury which flows from this container to the others will be varied accordingly.

Fig. 2 illustrates a modification of this arrangement, in which the container 17 is omitted, and the pipe 16 is connected to the container 40 and to the thermostat vessel 15. In this case, the vessel should be filled with a gas, and the expansion of the gas in the vessel 15 forces downwardly the mercury 41, and this in turn forces upwardly the mercury 22 and, as hereinabove described, closes more the valve 23. In this modification, the operation is similar to the operation in case of Fig. 1, except that the container 40 acts to vary the elevation of the mercury 22, not only by means of the displacement member 42, but also by means of the variations in pressure produced by the variations in temperature of the vessel 15. Also, the pipe 46 is omitted.

In Fig. 3, I have illustrated a modified form of mechanism for controlling the flow of the heating fluid to the tank 10. In this case, the containers 17, 40 and 21 are used with mercury in the lower portion thereof and, in general, the operation of the system is similar to the operation of the system of Fig. 1. However, I provide electrical means for operating the plunger 35 of the valve 23.

Mounted in the container 21 are electric contact members 50 and 51. Normally, the contact 50 is immersed in the mercury and the contact 51 is suspended above the mercury. These contacts are insulated from the container 21 by insulating plugs 52, and they are threaded into these plugs so that the lower ends of the contacts can be raised or lowered to suit the particular needs. These contacts are suitably connected with an electric motor 53 which, by means of the gears 54 and 55, operates a screw 56 threaded into the gear wheel 55, and elevates or lowers the stem 57 of the plunger 35.

The electric current comes from the supply leads 60, Fig. 4, through the transformer 61, if necessary, to the lines 62 and 63. When the temperature of the liquid 13 is increased, the increased pressure in the container 17 will force the mercury 22 upwardly into contact with the contact 51. An electric relay circuit is thus closed through the pipe 20, the mercury 22, the contact 51, coil 64, and lines 65 and 63. Coil 64, by suitable means, closes the switch 66, thus closing the circuit from line 62, motor 53, field coil 73, switches 72 and 66, and line 63. The motor is then operated in the direction to close more the valve 23, so as to decrease the flow of steam to the tank to compensate for the excess temperature of the liquid 13.

On the other hand, when the temperature of the liquid 13 lowers, the decreased pressure in the tank 17 will allow the mercury 22 to sink and the contact between the member 50 and the mercury will be broken. Normally, the electric current flows from the wire 62 along the pipe 20, mercury 22, contact 50, and through the coil 70, and this coil holds open the switch 71. When the contact is broken between the member 50 and the mercury, switch 71 will close, and the current will then be free to flow from the line 62, through the motor 53, field coil 70, switch 68, line 67, switch 71, and to the line 63. In this case, the motor will be rotated in the opposite direction, and the plunger 35 will be lowered so as to open more the valve, allowing more steam to flow to the tank 10 to compensate for the lowered temperature of the liquid 13.

As is the case with Fig. 1, it is desirable to provide means for stopping the movement of the plunger 35, as otherwise when the motor is once set in motion, it will continue to move the plunger until the valve is completely opened or closed. I provide for this purpose a displacement mass 75 partly submerged in the mercury 41 and connected to a stem 76 which, in turn, is connected directly or indirectly to the stem 57. As the plunger 35 is lowered, owing to the breaking of the contact between the mercury 22 and the member 50, the displacement mass 75 will be lowered, elevating the mercury 41 and thus enabling it to force upwardly the mercury 22 and to close again the contact of the mercury 22 and the member 50, thus stopping the motor and the movement of the plunger.

Similarly, if the plunger is being raised, the mass 75 will be raised, and this will allow the mercury level 22 to sink until contact of the mercury with the stem 51 is broken. In this manner, if the elements are properly formed and adjusted, the movement of the plunger 35 will be stopped, so as to maintain the temperature of the liquid 13 as desired. This adjustment may be brought about as in case of the mechanism of Fig. 1, or by varying the elevation of the contact 50 or 51 with reference to the mercury.

However, in order to prevent over-running of the plunger 35, I provide other means for limiting the movement of the plunger. These means comprise limit switches 68 and 72. Mounted on the rod 76 is a finger 77, preferably of insulating material, which, as the rod 76 is raised or lowered, will open the switch 72 or 68, as the case may be, thus breaking the motor circuit and stopping the motor. It will be understood that the relative positions of the finger and the switches will determine the range of movement of the plunger, and, hence, the maximum amount of opening or closing of the valve may be predetermined accordingly.

The screw 56 and finger 77 may be prevented from rotating by any suitable means, such as an arm 80, fixed with reference to the screw, which plays in a slot 81. The switches and other electrical elements are suitably insulated. It will also be understood that various modifications could be made with reference to various details, by those skilled in the art, without departing from the spirit of my invention as disclosed by the claims hereto.

Fig. 5 modifies Fig. 3 in the same general way that Fig. 2 modifies Fig. 1. In case of Fig. 5, the container 17 is also omitted; and the pipe 16 is connected to the thermostat 15 and to the container 82, which corresponds to the container 21 of Fig. 3. The remainder of the apparatus may be similar to that of Fig. 3, except that the plunger 85 of the valve 84 is inverted, thus closing downwardly instead of upwardly.

As the temperature of the fluid in the thermostat 15 increases, the mercury 87 will be forced downwardly, thus breaking contact with the member 50. The arrangement of the electric circuits in this case is substantially the same as in case of Fig. 3, except that, as the contact with the member 50 is broken, the motor will be rotated in the direction to move the plunger downwardly instead of upwardly, in order to close the valve 84 more and compensate for the increased temperature of the liquid 13. This action of the motor will result in forcing downwardly the displacement mass 75 and, thus, forcing mercury into the container 82 and elevating the mercury therein until the contact with the member 50 is again made. On the other hand, if the vessel 15 is cooled, the mercury 87 will rise, making contact with the member 51 and causing the motor to rotate in the direction to move the plunger 85 upwardly and open more the valve. The displacement member 75 being thus raised will allow mercury to flow into the container 40 until the contact with the member 51 is broken.

In case of Fig. 5, the thermostat acts directly on the container which operates the valve. But, in case of Fig. 2, the thermostat acts directly on the displacement container and through that container the thermostat acts on the container which operates the valve.

It is to be understood that further modifications of the apparatus may be made by those skilled in the art without departing from the spirit of my invention as disclosed by the following claims. For instance, the thermostat pressure may be passed into other chambers than those specified by proper modifications of the piping and other details.

I claim as my invention:

1. Apparatus for regulating the temperature of a fluid, comprising a vessel containing a fluid submerged in the fluid to be regulated, means for passing heat energy to the liquid, a valve for regulating the flow of said heat energy, a plurality of containers each containing a liquid and with the lower portions of the containers in communication with each other, means in one of the containers operatively associating the liquid surface therein with the said valve, and means causing the liquid level elevation in the latter container to be responsive to the movement of the valve, the upper portion of one of the containers being in communication with the vessel, whereby the liquid level elevation in the latter container is responsive to the fluid pressure in the vessel.

2. Apparatus for regulating the temperature of a fluid as claimed in claim 1, in which the operatively associating means comprises a float and means operatively associating the float with the valve.

3. Apparatus for regulating the temperature of a fluid as claimed in claim 1, the liquid in the containers being mercury, and the operatively associating means comprising an electric contact mounted in the container adjacent the liquid surface and an electric motor operatively associated with the contact member and the valve.

4. Apparatus for regulating the temperature of a fluid as claimed in claim 1, the latter means comprising a displacement member movably mounted in one of the containers and operatively associated with the valve.

5. Apparatus for regulating the temperature of a fluid as claimed in claim 1, and means for varying the horizontal cross sectional area of one of the containers.

6. Apparatus for regulating the temperature of a fluid as claimed in claim 1, the liquid in the containers being mercury, and the operatively associating means comprising an electric contact mounted in one of the containers adjacent the liquid surface, and an electric motor associated with the contact and the valve, and means for varying the horizontal cross sectional area of one of the containers.

7. Apparatus for regulating the temperature of a fluid as claimed in claim 1, the latter means comprising a displacement member movably mounted in one of the containers and operatively associated with the valve, the displacement member being mounted in one container, the valve operatively associated means being mounted in another container, and the upper portion of a third container being in communiaction with the vessel.

VINCENT V. VEENSCHOTEN.